United States Patent
Strock et al.

(10) Patent No.: US 11,268,183 B2
(45) Date of Patent: Mar. 8, 2022

(54) METHOD OF FORMING AN ABRASIVE COATING ON A FAN BLADE TIP

(71) Applicant: UNITED TECHNOLOGIES CORPORATION, Farmington, CT (US)

(72) Inventors: Christopher W. Strock, Kennebunk, ME (US); Paul M. Lutjen, Kennebunkport, ME (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 14/705,165

(22) Filed: May 6, 2015

(65) Prior Publication Data
US 2016/0326622 A1    Nov. 10, 2016

(51) Int. Cl.
*C23C 4/08* (2016.01)
*C23C 4/12* (2016.01)
(Continued)

(52) U.S. Cl.
CPC ............. *C23C 4/08* (2013.01); *C23C 4/06* (2013.01); *C23C 4/12* (2013.01); *C23C 4/123* (2016.01); *C23C 4/134* (2016.01); *C23C 4/18* (2013.01); *F01D 5/288* (2013.01); *F01D 11/122* (2013.01); *F05D 2230/312* (2013.01); *F05D 2300/121* (2013.01); *Y02T 50/60* (2013.01)

(58) Field of Classification Search
CPC .. C23C 4/08; C23C 4/18; C23C 4/123; C23C 4/06; C23C 4/134; C23C 4/12; F01D 11/122; F01D 5/288; Y02T 50/60; F05D 2300/121; F05D 2230/312
USPC ................................. 427/446, 455, 456, 180
See application file for complete search history.

(56) References Cited

U.S. PATENT DOCUMENTS 3,891,901 A * 6/1975 Booe .................... H01G 4/232
                                                          361/305
4,386,112 A * 5/1983 Eaton .................... B05D 1/10
                                                          427/422
(Continued)

FOREIGN PATENT DOCUMENTS

EP    1681440          7/2006
EP    2338637 A2       6/2011
(Continued)

OTHER PUBLICATIONS

European Search Report for European Application No. 16168629.0, dated Sep. 15, 2016, 10 pages.
(Continued)

*Primary Examiner* — Dah-Wei D. Yuan
*Assistant Examiner* — Nga Leung V Law
(74) *Attorney, Agent, or Firm* — Cantor Colburn LLP (57) ABSTRACT

A novel method of depositing grit particles onto a fan blade tip coating is provided. The method enhances grit capture by presenting a softened coating surface for the impinging particles. The softened surface is achieved without high substrate temperatures that could degrade the base metal properties in the fan blade. An auxiliary heat source is used to establish a locally heated and softened surface where the grit deposition takes place. The softened surface greatly increases the probability of grit capture.

16 Claims, 5 Drawing Sheets

(51) Int. Cl.
  *C23C 4/06*     (2016.01)
  *C23C 4/134*    (2016.01)
  *C23C 4/123*    (2016.01)
  *C23C 4/18*     (2006.01)
  *F01D 5/28*     (2006.01)
  *F01D 11/12*    (2006.01)

(56) References Cited

U.S. PATENT DOCUMENTS

| | | | | |
|---|---|---|---|---|
| 4,548,863 | A * | 10/1985 | Hicks | C08K 7/28 |
| | | | | 427/204 |
| 4,735,656 | A | 4/1988 | Schaefer et al. | |
| 5,141,400 | A | 8/1992 | Murphy et al. | |
| 5,264,011 | A | 11/1993 | Brown et al. | |
| 5,551,840 | A | 9/1996 | Benoit et al. | |
| 5,952,110 | A | 9/1999 | Schell et al. | |
| 6,544,002 | B1 | 4/2003 | Evans et al. | |
| 8,616,847 | B2 | 12/2013 | Allen | |
| 8,906,181 | B2 | 12/2014 | Hansen, Sr. et al. | |
| 2004/0031776 | A1 * | 2/2004 | Gevelber | B05B 12/082 |
| | | | | 219/121.36 |
| 2008/0286108 | A1 | 11/2008 | Lui et al. | |
| 2011/0164963 | A1 * | 7/2011 | Taylor | C23C 4/06 |
| | | | | 415/173.4 |
| 2011/0268956 | A1 * | 11/2011 | Fagoaga Altuna | C23C 4/11 |
| | | | | 428/304.4 |
| 2012/0099971 | A1 * | 4/2012 | Bintz | C23C 28/022 |
| | | | | 415/173.6 |
| 2013/0004301 | A1 * | 1/2013 | Strock | C23C 28/3215 |
| | | | | 415/174.4 |
| 2013/0004328 | A1 * | 1/2013 | Wrabel | F01D 5/005 |
| | | | | 416/241 R |
| 2013/0288037 | A1 * | 10/2013 | Sun | H01J 37/32082 |
| | | | | 428/312.8 |
| 2014/0147242 | A1 * | 5/2014 | Ghasripoor | F16J 15/445 |
| | | | | 415/1 |

FOREIGN PATENT DOCUMENTS

| | | |
|---|---|---|
| EP | 2449216 | 5/2012 |
| EP | 2540961 A2 | 1/2013 |
| WO | 2015123274 A1 | 8/2015 |

OTHER PUBLICATIONS

H.C. Pedersen, "Abrasive Tip Treatment For Use On Compressor Blades", NASA CR-174666, Jan. 1, 1984, 74 pages.

* cited by examiner

METHOD OF FORMING AN ABRASIVE COATING ON A FAN BLADE TIP

FIELD OF THE DISCLOSURE

The subject matter of the present disclosure relates generally to a method of finishing a rotating turbomachine component such as a fan blade. More particularly, the subject matter relates to a method of forming an abrasive coating on a fan blade tip of the type used in gas turbine engines.

BACKGROUND OF THE DISCLOSURE

Gas turbine engines, such as those used on jet aircraft, generally comprise an air intake port, a fan section, a low pressure compressor (LPC) section, an intermediate section aft of the LPC section, a high pressure compressor (HPC) section, a combustion chamber or combustor, high and low pressure turbines that provide rotational power to the compressor blades and fan respectively, and an exhaust outlet. The fan and LPC section may be operably connected to the low pressure turbine by an inner drive shaft which rotates about an engine center axis. A cone-like spinner may be mounted over the hub forward the fan blades to help guide air flow.

The fan section generally comprises fan blades mounted to a hub and enclosed within a fan case assembly. The fan case assembly generally comprises a fan containment case and an abradable liner (a.k.a. outer air seal) disposed within the fan containment case. The clearance between the fan blade tips and the abradable liner is generally kept to a minimum for maximum engine efficiency.

One practice used in the aerospace industry to optimize the clearance between the fan blade tips and the abradable liner is to apply an abrasive coating on the fan blade tips, then operate the fan until the abrasive coating rubs off a desired amount of the abradable liner.

Examples of coatings for abradable liners can be found in U.S. Pat. Nos. 3,575,427, 6,334,617, and 8,020,875. One exemplary baseline coating comprises a silicone matrix with glass micro-balloon filler. Without the glass micro-balloon filler, the elastic properties of the abradable coating results in vibrational resonances and non-uniform rub response. The glass micro-balloons increase the effective modulus of the coating so as to reduce deformation associated with aerodynamic forces and resonances. More recent proposals include fillers such as polymer micro-balloons (PCT/US2013/023570) and carbon nanotubes (PCT/US2013/023566).

For interfacing with the abradable liner, the fan blade tips may bear an abrasive coating. US Patent Application Publication 2013/0004328 A1, published Jan. 3, 2013, and entitled "Abrasive Airfoil Tip" discloses a number of such coatings.

The present disclosure is directed to forming an abrasive coating on a fan blade tip. Among other benefits, the method reduces heat generation when the fan blade tip rubs against the abradable liner.

SUMMARY OF THE DISCLOSURE

A novel method of forming an abrasive coating on a surface of a rotating turbomachine component such as a fan blade tip is provided. The fan blade comprises an airfoil section and a tip. The airfoil section has a metallic substrate such as aluminum. The fan blade is mounted to a hub and is configured to rotate within a fan case assembly. The fan case assembly comprises an abradable liner made of an abradable material.

The method enhances grit capture by presenting a softened coating surface for the impinging grit particles. The softened surface is achieved without high substrate temperatures that could degrade the base metal properties in the fan blade. An auxiliary heat source is used to establish a locally heated and softened surface where the grit deposition takes place. The softened surface greatly increases the probability of grit capture.

In one aspect, the method comprises the steps of providing a feedstock of aluminum powder; heating the aluminum powder until the aluminum powder is molten; spraying the molten aluminum powder onto a spray plume area of the fan blade tip with a plasma spray gun to form a coating; and depositing grit particles onto the coating while maintaining the temperature of the coating within a desired range by controlling deposition rate parameters.

The deposition rate parameters include aluminum powder feed rate, traverse rate of the plasma spray gun and the spray plume area.

The aluminum powder feed rate may be between about 20 g/min and 120 g/min, and preferably between about 30 g/min and 60 g/min.

The traverse rate of the plasma spray gun may be between about 1200 inches per minute and about 20 inches per minute, and preferably between about 900 inches per minute and about 500 inches per minute.

The aluminum powder may be heated by introducing the powder into a plasma plume emanating from a plasma spray gun.

Before the depositing step the grit particles may be introduced into a plasma jet stream downstream from the plasma plume so the grit particles do not melt.

The grit particles should be harder than the abradable material in the abradable liner, which may be glass micro-balloons.

The airfoil section of the fan blade may comprise a metal-based material such as aluminum or an aluminum alloy.

In another aspect of the disclosure the traverse rate of the plasma spray gun may be varied during the spraying step.

In another aspect the plasma spray gun is directed along a spray path. The spray path may be varied to increase spray path spacing or to increase or decrease spray overlap.

In another aspect the plasma spray gun has an axis of rotation and an axis of powder injection substantially perpendicular to the axis of rotation of the spray gun and, during the spraying step, the plasma spray gun is rotated about its axis of rotation. The plasma spray gun may be oriented with its axis of powder injection substantially parallel to the traverse direction (to minimize spray plume width) or in any other orientation with respect to the traverse direction, and may change during spraying.

BRIEF DESCRIPTION OF THE DRAWINGS

So that the manner in which the concepts of the present disclosure recited herein may be understood in detail, a more detailed description is provided with reference to the embodiments illustrated in the accompanying drawings. It is to be noted, however, that the accompanying drawings illustrate only certain embodiments and are therefore not to be considered limiting of the scope of the disclosure, for the concepts of the present disclosure may admit to other equally effective embodiments. Moreover, the drawings are not necessarily to scale, emphasis generally being placed upon illustrating the principles of certain embodiments.

Thus, for further understanding of these concepts and embodiments, reference may be made to the following detailed description, read in connection with the drawings in which.

DETAILED DESCRIPTION OF THE DISCLOSURE

In the disclosure that follows certain relative positional terms may be used such as "forward", "aft", "upper", "lower", "above", "below", "inner", "outer" and the like. These terms are used with reference to the normal operational attitude of a jet engine and should not be considered otherwise limiting. The forward end of a jet engine generally refers to the air intake port end and the aft end generally refers to the exhaust end. Also, "radially outward" generally refers to a direction away from the engine center axis while "radially inward" refers to a direction toward the engine center axis. Finally, although the following disclosure relates to a method of forming an abrasive coating on a fan blade tip, it should be understood that the method may be used with other components.

Figure 1:
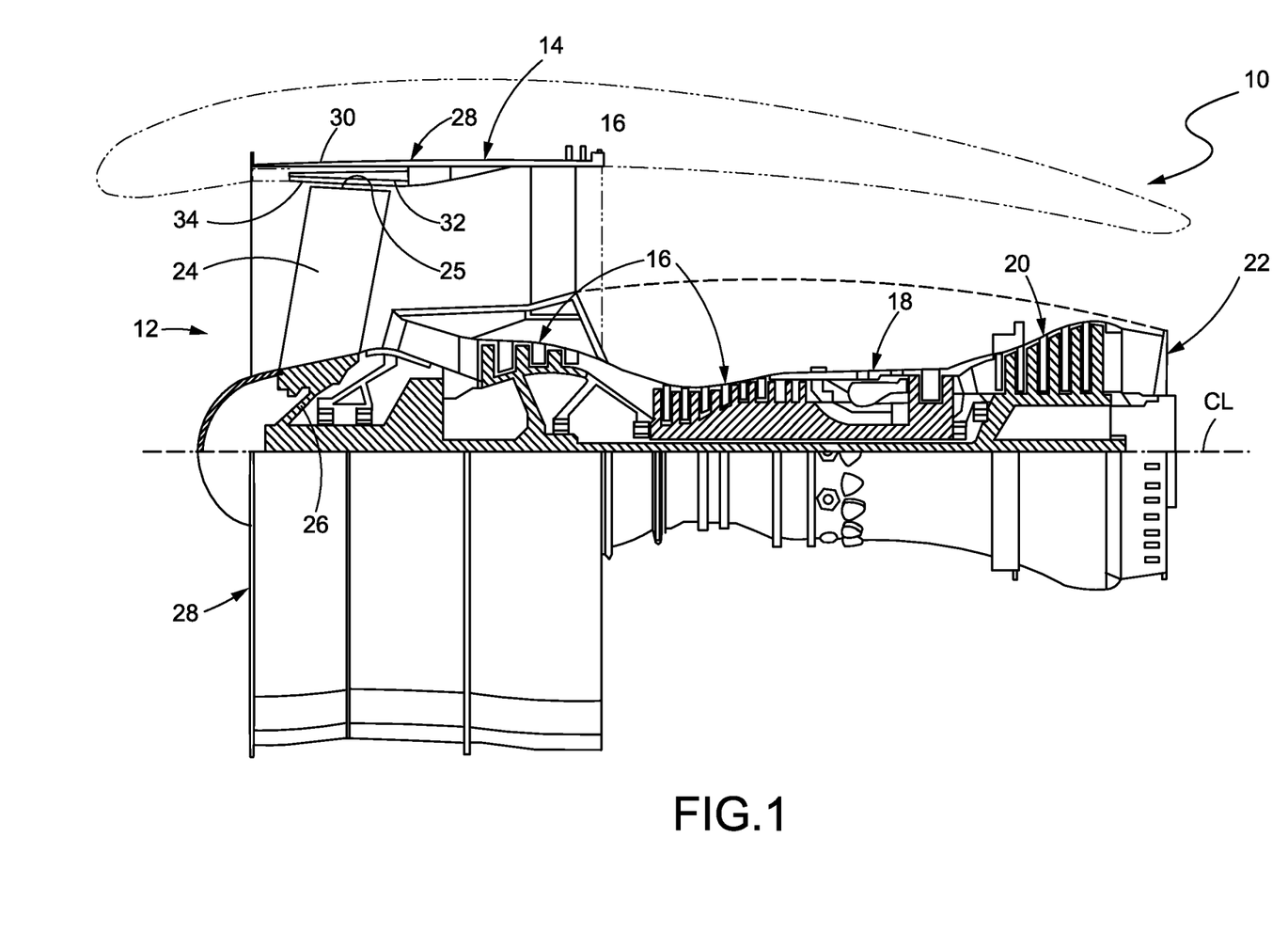
FIG. 1 is a partial side cross-sectional view of an exemplary gas turbine engine.

Turning to the figures, FIG. 1 is a longitudinal partial cross-sectional view of an exemplary gas turbine engine 10. The gas turbine engine 10 comprises an air inlet 12, a fan section 14, a single or multi-stage compressor section 16, a combustion section 18 downstream of the compressor section 16, a single or multi-stage turbine section 20, and an exhaust nozzle 22. Air entering the air inlet 12 flows through the compressor section 16 and into the combustion section 18 where it provides oxygen for fuel combustion. The hot combustion gases pass through the turbine section 20 and exit the exhaust nozzle 22, providing a portion of the engine's thrust.

Figure 2:
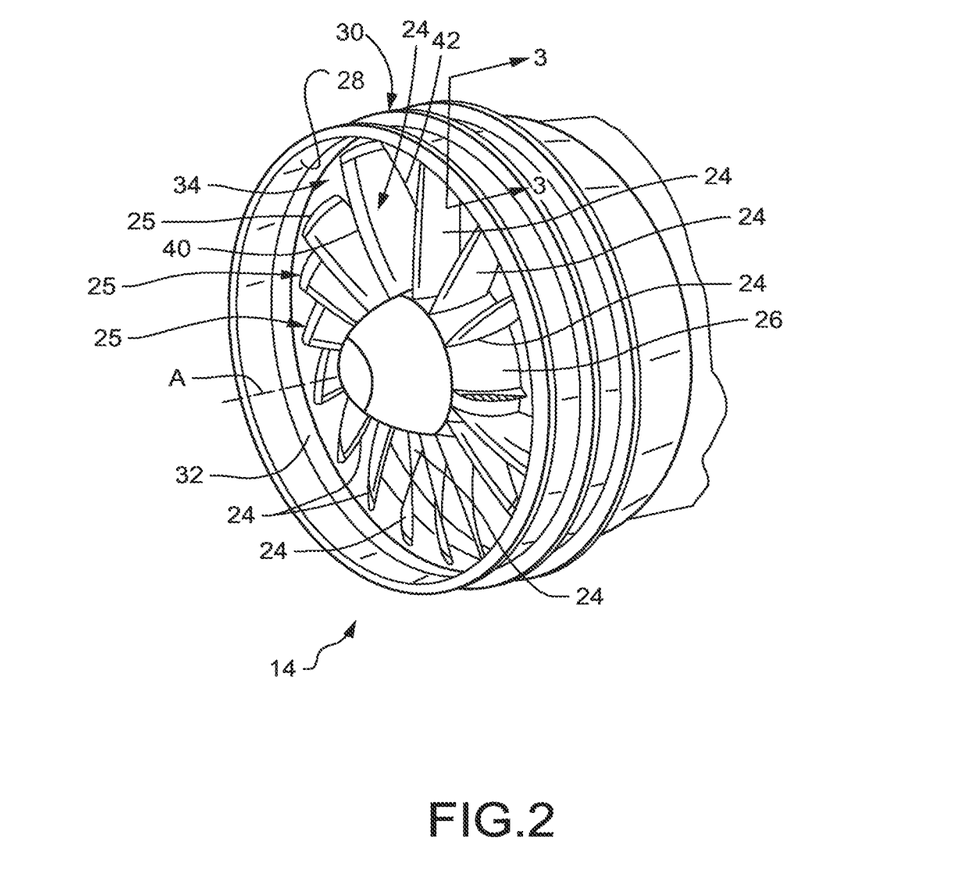
FIG. 2 is a perspective view of the fan section of a gas turbine engine, including a fan case assembly and fan blades.

FIG. 2 is a perspective view of a fan section 14 as may be found in a typical gas turbine engine 10. The fan section 14 generally comprises a plurality of circumferentially-spaced fan blades 24 mounted to a hub 26 and enclosed within a fan case assembly 28. The fan case assembly 28 may comprise a thermally conforming liner 32 disposed within a fan containment case 30. The fan containment case 30 is annular in shape and circumscribes the fan blades 24.

The fan section 14 is designed such that the tolerance between the fan blades 24 and the fan containment case 30 is extremely small. To achieve this tolerance, the fan may be initially operated so that the fan blades 24 rub against the fan containment case 30, as explained in more detail with respect to FIG. 3.

Figure 3:
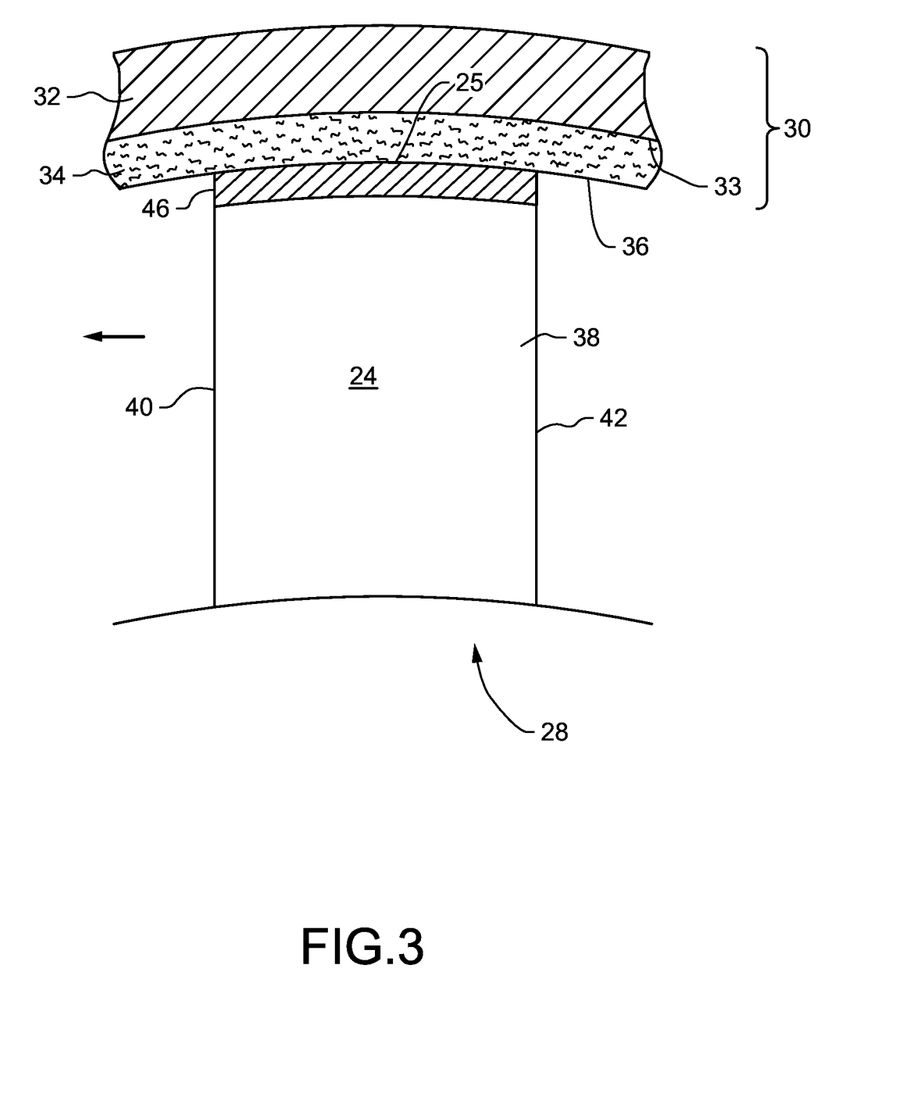
FIG. 3 is a cross-sectional view of the fan section of FIG. 2 taken along line 3-3 and showing a partial fan blade and a portion of the abradable liner 34.

FIG. 3 is a cross-sectional view of the fan case assembly 28 of FIG. 2, taken along line 3-3 and showing a partial fan blade 24 and a portion of the abradable liner 34. A portion of the thermally conforming liner 32 disposed axially outward from the fan blades 24 is covered with an abradable liner 34 circumferentially mounted on a radially inner surface 33 of the thermally conforming liner 32. The abradable liner 34 may comprise an abradable rub material or coating and has an inboard surface 36 in close proximity to the fan blade tips 25.

The abradable liner 34 may be formed of or coated with a polymeric based material, such as a polymer matrix composite. The polymeric based material may include an epoxy matrix and a silica-containing filler dispersed through the matrix. In a further example, the abradable material may comprise a silica-containing filler that includes hollow glass micro-balloons, a.k.a. micro-bubbles or micro-spheres.

The fan blade 24 includes an airfoil section 38 that extends between a leading edge 40 and a trailing edge 42 and between a base 44 (FIG. 2) and a free tip 25. The fan blade tip 25 is covered with an abrasive coating 46, the purpose of which is described below.

The airfoil section 38 of the fan blade 24 may be formed of a metal-based material and may have a polymeric overcoat on its exterior surface to protect the airfoil section 38 from damage due to foreign particulates ingested into the engine 10. In one example, the metal-based material of the airfoil section 38 is aluminum or an aluminum alloy. The polymeric coating can be a polyurethane-based coating, an epoxy-based coating, or a silicone rubber-based coating, but is not limited to these types of polymeric coatings or materials.

When two components, such as a fan blade tip 25 and an abradable liner 34, are in rubbing contact, at least one of the components may wear. The term "abradable" refers to the component that wears, while the other component is "abrasive" and does not wear or wears less. The word "abrasive" also implies that there is or can be contact with an abradable component. Thus, when the abrasive tips 25 of the fan blades 24 rub against the abradable liner 34, the abradable liner 34 will be worn, whereas the abrasive tips 25 will not wear or will wear less than the abradable liner 34.

Friction between the fan blade tip 25 and the abradable liner 34 generates heat. The heat can be conducted into the fan containment case 30, into the fan blade 24, or both. However, in particular for metal fan blades 24 and polymeric-based fan containment cases 30, the metal of the fan blade 24 is generally a better thermal conductor than the polymer of the fan containment case 30, and a majority of the heat thus is conducted into the fan blade 24. While this may normally not present any problems for a plain metal fan blade 24, the heat conduction can be detrimental to a metal fan blade 24 that has a polymeric overcoat because the heat can cause delamination of the polymeric overcoat and thus compromise the damage protection.

Figure 4:
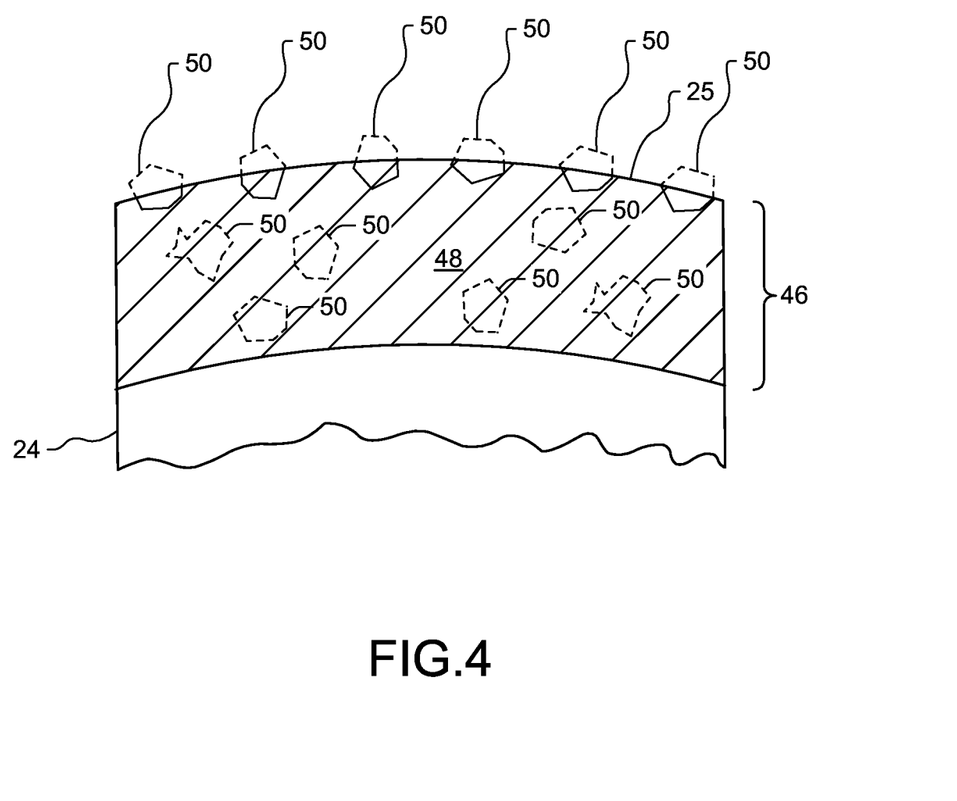
FIG. 4 is a close up view of a fan blade tip and abrasive tip coating according to the disclosure.

FIG. 4 is a close up view of a fan blade tip 25 according to the disclosure. The fan blade tip 25 is covered with an abrasive coating 46 comprising a metal matrix coating 48 and hard particles 50 deposited on or in the metal matrix coating 48. The metal matrix coating 48 and the metal-based material of the fan blade 24 may be compositionally composed of the same predominant metal, such as aluminum, which can promote strong adhesion between the abrasive coating 46 and the fan blade 24.

Figure 5:
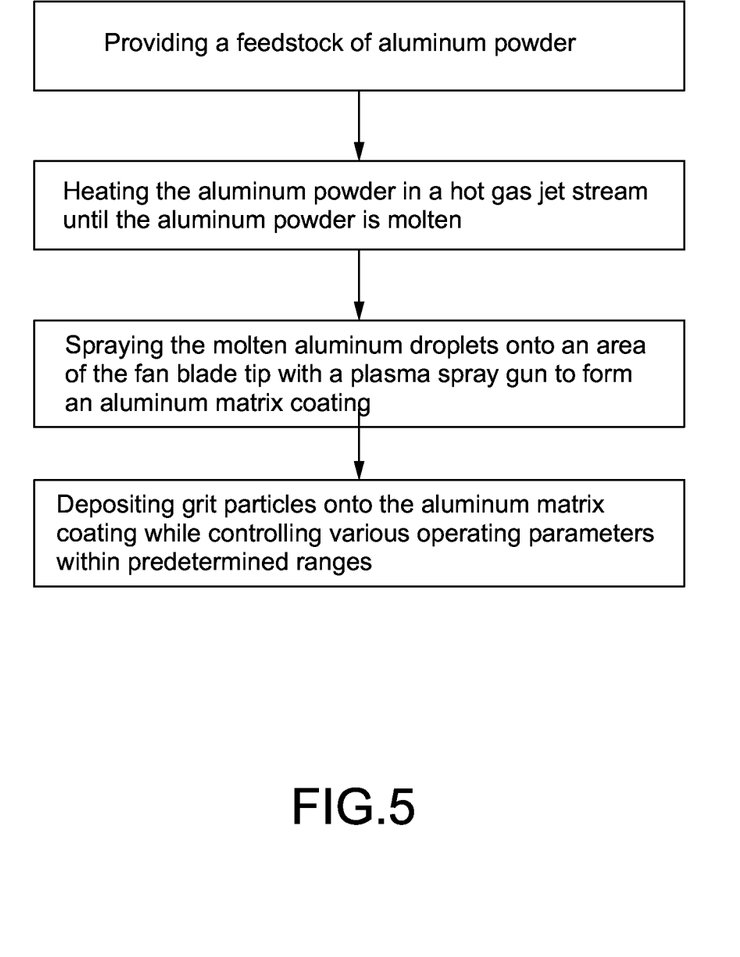
FIG. 5 is a schematic of a method of finishing a fan blade according to the disclosure.

FIG. 5 is a schematic of a method of finishing a fan blade 24 according to the disclosure. The method may comprise the following steps:

Providing a feedstock of aluminum powder.

Heating the aluminum powder until the aluminum powder is molten. The aluminum powder may be introduced into a plasma plume emanating from a plasma spray gun (a.k.a. plasma spray torch), resulting in an electrically heated gas jet stream. The heat energy from the plasma spray gun is transferred to the aluminum powder particles, converting them into molten aluminum droplets. The molten droplets are then propelled toward the fan blade tip 25 by the gas jet stream.

Spraying the molten aluminum droplets onto an area of the fan blade tip 25 to form an aluminum matrix coating 48. When the molten aluminum droplets hit the surface of the fan blade tip 25 they spread out and cool rapidly due to conductive heat transfer, mainly into the metallic fan blade 24. At this point the droplets may be referred to as "splats." Spraying can be done via a plasma spray gun.

Depositing grit particles 50 onto the aluminum matrix coating 48 via a plasma jet stream or other means, while maintaining the temperature of the aluminum matrix coating 48 by controlling certain deposition rate parameters as explained below.

The grit particles 50 may be introduced into the plasma jet stream downstream from the plasma plume where the temperature of the plasma jet stream is lower. The grit particles 50 do not melt but remain angular in shape. Thus, if a sharp corner of a grit particle 50 hits the surface of the aluminum matrix coating 48 first, the sharp corner may create an indent into the still-soft aluminum matrix coating 48, and stick there via mechanical embedding. Preferably the grit particles 50 are harder than the abradable material in the abradable liner 34, which as noted above can be glass micro-balloons.

The likelihood that any grit particle 50 sticks to the aluminum matrix coating 48 is a function of certain "deposition rate parameters". The deposition rate parameters may include the velocity of the grit particle 50, the size and shape of the grit particle 50, the orientation with which the grit particle 50 impacts the aluminum matrix coating 48, the temperature of the grit particles 50, and the "softness" and "stickiness" of the aluminum matrix coating 48, as well as the aluminum powder feed rate, traverse rate of the plasma spray gun and spray plume area.

Accordingly, during the deposition step, certain deposition rate parameters are controlled to optimize or otherwise control grit particle deposition. For example, the surface of the aluminum matrix coating 48 can be intentionally made hotter to make it softer and stickier, i.e., having a higher tendency to capture the grit particles 50.

Passive control of the deposition spot temperature can be achieved through control of the deposition rate parameters. For example, the deposition spot temperature is generally directly proportional to the aluminum powder feed rate and the molten aluminum temperature, and inversely proportional to the spray plume area and traverse rate of the plasma spray gun.

Because aluminum is so heat conductive, there exists a high thermal gradient between the hot aluminum matrix coating 48 and the aluminum fan blade 24. As a consequence, heat is quickly conducted away from the aluminum matrix coating 48, which helps keep the temperature of the aluminum fan blade 24 in the vicinity of the aluminum matrix coating 48 below an acceptable limit, thus protecting the mechanical properties of the fan blade 24. To counteract this phenomena, and to optimize the surface temperature of the aluminum matrix coating 48 where the grit particles 50 are being deposited, at least three deposition rate parameters may be controlled: aluminum powder feed rate, traverse rate of the plasma spray gun, and the area of the spray plume on the fan blade tip 25.

Aluminum powder feed rate. "Aluminum droplet flux" is the rate of aluminum droplet deposition per given area of the fan blade tip 25, and may be expressed in units of grams/minute/area, where the area is determined by the plume width times the distance traversed by the plasma spray gun. Increasing the aluminum droplet flux by impinging more hot aluminum droplets on an area of the fan blade tip 25 over a given period of time generally helps maintain the temperature of the aluminum matrix coating 48 at an acceptably high level. But adding too much aluminum powder to the plasma jet stream can result in poor heating (and melting) of the aluminum powder. The aluminum powder feed rate may be controlled to stay in an operable range of between about 20 g/min and 120 g/min. More preferably, the aluminum powder feed rate is between about 30 g/min and 60 g/min.

Traverse rate of the plasma spray gun. Traverse rate is the rate of linear travel of the plasma spray gun across the surface of the fan blade tip 25, and may be expressed in units of distance/time. Increasing the traverse rate by moving the plasma spray gun (or other thermal spray means) across the surface of the fan blade tip 25 more quickly results in a lower deposition of aluminum droplets per area, where area is calculated as the traverse rate times the spray plume width. The traverse rate of the plasma spray gun may be between about 1200 inches per minute and about 20 inches per minute. More preferably, the traverse rate of the plasma spray gun is between about 900 inches per minute and about 500 inches per minute. The plasma spray gun power may be 39 kilowatts (kW) or higher. Too much power or a too slow traverse rate can melt the aluminum substrate of the fan blade tip 25.

Spray plume area. As noted above, spray plume area is determined by the spray plume width and the distance traversed by the plasma spray gun. Heat flux is a measure of the rate of energy (heat) transfer through a surface per unit area. In this application heat flux is a measure of the rate of heat transfer from the molten aluminum droplets through the surface of the fan blade tip 25 for a given spray plume area. Increasing the heat flux increases the temperature of the surface of the fan blade tip 25 which increases the grit deposition efficiency. Increasing the spray plume area on the fan blade tip 25 causes the heat flux to decrease, an undesirable effect. Therefore it is preferred that the spray plume is kept more concentrated (by decreasing the spray plume width as it traverses the fan blade tip 25) for the same number of aluminum droplets, resulting in a higher heat flux.

Once the abrasive coating 46 is formed on the fan blade tip 25, the fan blades 24 are placed within a fan containment case 30 having an abradable liner 34. The fan is then operated so that the abrasive fan blade tips 25 wear out a portion of the abradable liner 34, creating an ideal tolerance (spacing) between the fan blades 24 and the liner 34.

As noted above, the abradable liner 34 may comprise epoxy bonded glass micro-balloons. If a smooth ("bare metal") fan blade tip is rubbed against such an abradable liner 34, the temperature can increase to 700 F or more due to frictional heating. Applying an abrasive to the fan blade tip 25 the harder grit particles 50 cut into the micro-balloons, resulting in high local pressures but lower, and better, temperatures.

Example

The method described herein has been shown to result in a deposition efficiency of about 45% (measured as the percentage of grit particles 50 that stick to the metal matrix coating 48) compared to about 5.6% in baseline methods.

This increase in deposition efficiency results in an increase in grit concentration in the abrasive coating 46, and higher wear resistance in service.

INDUSTRIAL APPLICABILITY

There has been described a novel method of depositing grit particles 50 onto a metal matrix coating 48 that enhances grit capture by presenting a softened coating surface for the impinging grit particles 50. The softened surface is achieved without causing the temperature of the substrate (i.e., the fan blade 24 in the vicinity of the metal matrix coating 48) to exceed an acceptable temperature that could degrade the aluminum base metal properties in the fan blade 24. An auxiliary heat source such as a laser or the heat of the spray process itself may be used to establish a locally heated and softened metal matrix coating surface where the grit deposition is taking place. The softened surface greatly increases the probability of grit capture.

The use of an auxiliary heat source for localized heating of the metal matric coating 48 also provides localized temperature control (of the metal matrix coating 48) better than that which can be achieved using practical (conventional) spray parameters. The use of an auxiliary heat source for localized heating of the metal matric coating 48 also allows the control of deposition rate parameters to levels chosen for considerations other than grit capture. The method may also be used to vary grit concentration locally by changing certain deposition rate parameters.

For example, local grit concentration can be locally controlled through relative torch to part motions. The simplest method to accomplish this control is to vary the traverse rate over the part to achieve a higher surface temperature and higher resultant grit concentration in an area where traverse is relatively slower. However, this method results in relatively thicker coating in the area of reduced traverse speed. This may be overcome by locally reducing the number of time the torch traverses over the area or by concurrently varying spray path spacing and related spray stripe overlap. Alternatively, rotational orientation of the spray torch about its axis may be used to adjust the width of the spray plume. This is achieved by taking advantage of the typically asymmetric powder and droplet distribution caused by substantially radial powder injection. By rotating the torch to position the powder injection parallel to the traverse direction, the spray plume has its minimum width, when it is perpendicular to the traverse direction, the spray plume is at its maximum width. Thus, by changing the rotational orientation of the spray torch about its axis, particle flux may be adjusted to achieve the desired local control of abrasive grit concentration in the coating.

The invention claimed is:

1. A method of forming an abrasive coating on a rotating turbomachine component, the rotating turbomachine component comprising an airfoil section and a tip, the airfoil section and the tip having an aluminum or aluminum alloy substrate, the rotating turbomachine component designed to rotate within an abradable liner made of an abradable material, the method comprising the steps of:
   providing a feedstock consisting of aluminum powder;
   heating the aluminum powder until the aluminum powder is molten;
   spraying the molten aluminum powder onto the substrate of the tip with a plasma spray gun to form a coating consisting of aluminum, wherein the plasma spray gun has an axis of rotation and an axis of powder injection substantially perpendicular to the axis of rotation; and
   depositing grit particles onto the coating while maintaining a temperature of the coating within a desired range by controlling deposition rate parameters; wherein
   the deposition rate parameters include an aluminum powder feed rate of 20 g/min to 120 g/min, a traverse rate of the plasma spray gun of 1200 inches per minute to 20 inches per minute, a traverse direction substantially parallel to the axis of powder injection, and a spray plume area.

2. The method of claim 1 wherein the aluminum powder feed rate is between about 30 g/min and 60 g/min.

3. The method of claim 1 wherein the traverse rate of the plasma spray gun is between about 900 inches per minute and about 500 inches per minute.

4. The method of claim 1 wherein the aluminum powder is heated by introducing the powder into the plasma plume emanating from the plasma spray gun.

5. The method of claim 4 wherein before the depositing step the grit particles are introduced into a plasma jet stream downstream from the plasma plume so the grit particles do not melt.

6. The method of claim 1 wherein the rotating turbomachine component is a fan blade.

7. The method of claim 1 wherein during the spraying step the traverse rate of the plasma spray gun is varied.

8. The method of claim 1 wherein during the spraying step the plasma spray gun is directed along a spray path.

9. The method of claim 8 wherein the spray path is varied to increase spray path spacing.

10. The method of claim 8 wherein the spray path is varied to increase or decrease spray overlap.

11. The method of claim 1 wherein the plasma spray gun has an axis of rotation and wherein, during the spraying step, the plasma spray gun is rotated about its axis of rotation.

12. The method of claim 1 wherein the plasma spray gun has an axis of rotation and wherein, during the spraying step, the axis of rotation changes.

13. A method of forming an abrasive coating on a fan blade, the fan blade comprising an airfoil section and a tip, the airfoil section and tip having an aluminum or aluminum alloy substrate, the fan blade mounted to a hub and configured to rotate within a fan case assembly, the fan case assembly comprising an abradable liner made of an abradable material, the method comprising the steps of:
   providing a feedstock consisting of aluminum powder;
   heating the aluminum powder until the aluminum powder is molten;
   spraying the molten aluminum powder onto the substrate of the fan blade tip with a plasma spray gun to form a matrix coating consisting of aluminum, wherein the plasma spray gun has an axis of rotation and an axis of powder injection substantially perpendicular to the axis of rotation; and
   depositing grit particles onto the matrix coating while maintaining a temperature of the matrix coating within a desired range by controlling deposition rate parameters;
   wherein the deposition rate parameters include an aluminum powder feed rate of 20 g/min to 120 g/min, a traverse rate of the plasma spray gun of 1200 inches per minute to 20 inches per minute, a traverse direction substantially parallel to the axis of powder injection, and a spray plume area.

14. The method of claim 13 wherein the grit particles are harder than the abradable material in the abradable liner.

15. The method of claim 14 wherein the abradable liner comprises epoxy bonded glass micro-balloons.

16. A method of forming an abrasive coating on a rotating turbomachine component, the rotating turbomachine component comprising an airfoil section and a tip, the airfoil section and the tip having an aluminum or aluminum alloy substrate, the rotating turbomachine component designed to rotate within an abradable liner made of an abradable material, the method comprising the steps of:
- providing a feedstock consisting of aluminum powder;
- heating the aluminum powder until the aluminum powder is molten;
- spraying the molten aluminum powder onto the substrate of the tip with a plasma spray gun to form a coating consisting of aluminum, wherein the plasma spray gun has an axis of rotation and an axis of powder injection substantially perpendicular to the axis of rotation; and
- depositing grit particles onto the coating while maintaining a temperature of the coating within a desired range by controlling deposition rate parameters; wherein
- the deposition rate parameters include an aluminum powder feed rate of 30 g/min to 60 g/min, a traverse rate of the plasma spray gun of 900 inches per minute to 500 inches per minute, a traverse direction substantially parallel to the axis of powder injection, and a spray plume area.

* * * * *